(12) United States Patent
Vaan De

(10) Patent No.: US 6,454,413 B1
(45) Date of Patent: Sep. 24, 2002

(54) IMAGE PROJECTION SYSTEM

(75) Inventor: Adrianus Johannes Stephanes Maria Vaan De, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/716,874

(22) Filed: Nov. 20, 2000

(30) Foreign Application Priority Data

Nov. 22, 1999 (EP) .............................................. 99203907

(51) Int. Cl.$^7$ ......................... G03B 21/28; G02F 1/1335
(52) U.S. Cl. .............................. 353/20; 353/33; 353/34; 353/99; 349/9
(58) Field of Search ............................. 353/20, 33, 34, 353/31, 81, 82, 98, 99; 349/5, 8, 9

(56) References Cited

U.S. PATENT DOCUMENTS 6,309,073 B1 * 10/2001 Nakayama et al. ....... 353/20 X

FOREIGN PATENT DOCUMENTS

| EP | 0606940 A2 | 7/1994 | ............ G02B/5/30 |
| EP | 0467447 A1 | 1/1999 | ............ G02B/5/30 |

* cited by examiner

Primary Examiner—W. B. Perkey
(74) Attorney, Agent, or Firm—Dicran Halajian

(57) ABSTRACT

The invention relates to an image projection system. The image projection system comprises a radiation source, polarization-sensitive filter means, polarization conversion means, and color filter means for supplying a first and a second light beam having a first color and a first direction of polarization and a second color and a second direction of polarization, respectively, to a modulation system comprising two image panels for modulating the first and second light beams with image information. In order to obtain a compact projection system in the image projection system according to the invention, the areas occupied by said polarization-sensitive filter means, polarization conversion means and color filter means coincide.

11 Claims, 2 Drawing Sheets

IMAGE PROJECTION SYSTEM

Figure 1:
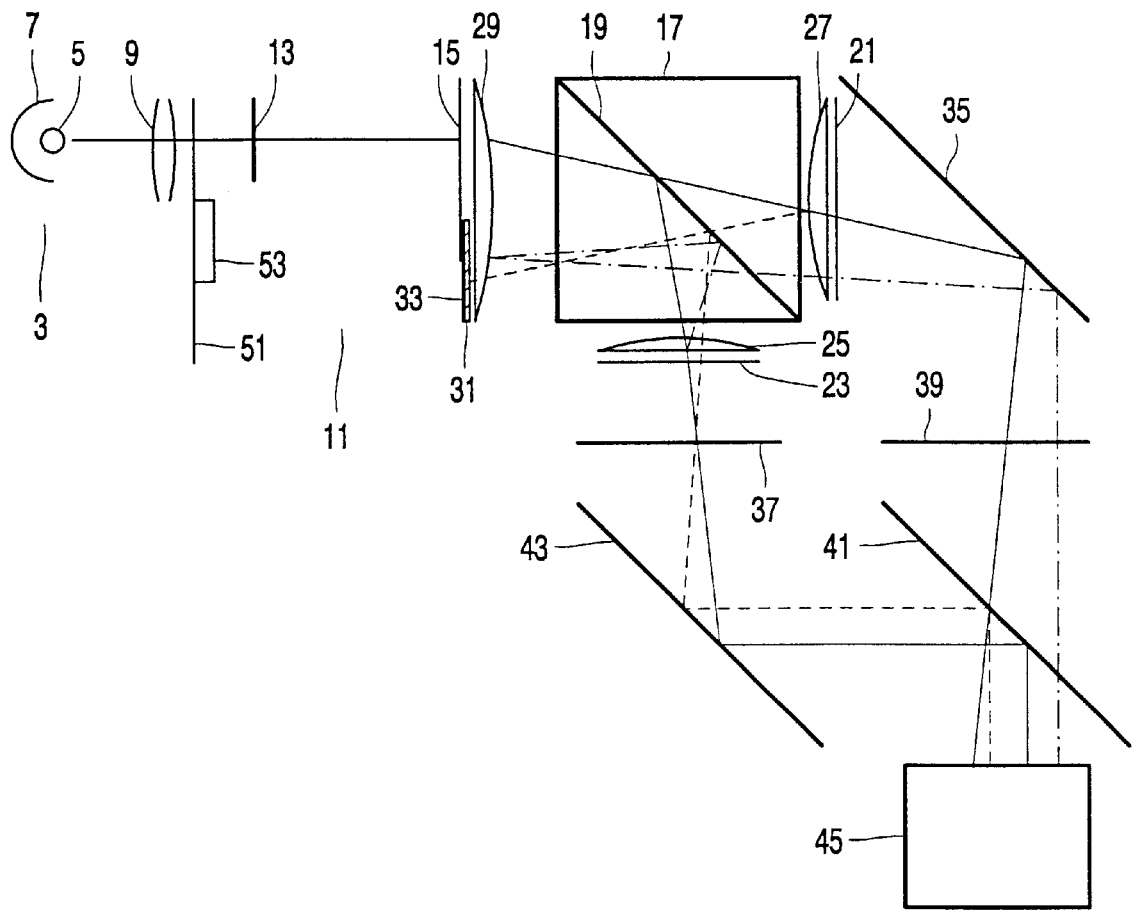

The invention relates to an image projection system as defined in the preamble of claim 1. The image projection system can be used for displaying image information from a television receiver or a personal computer on a projection screen.

Such a projection system is known from European patent application EP 467447. The projection system described in this document comprises an illumination system for supplying an illumination beam and an image display system comprising three liquid crystal image panels for modulating the light beam in conformity with image information to be projected. The illumination system comprises an integrator system for uniformly distributing the light across the liquid crystal panels. In the known LCD projection system, the light beam having different directions of polarization is separated by a polarization-sensitive beam splitter into two separate light sub-beams having directions of polarization which are perpendicular to each other. The polarization conversion means converts the direction of polarization of one of the two light sub-beams into the other direction of polarization and recombines the converted light sub-beam with the unconverted light sub-beam. Subsequently, the recombined light beam is divided into three further light sub-beams in three respective primary colors by dichroic mirrors. The image panel may be a liquid crystal panel comprising two optically transparent plates between which a liquid crystal layer is provided. Furthermore, the liquid crystal panel is provided with a two-dimensional array of pixels which are driven by means of, for example electrodes. The present configuration of the illumination system comprises a cascade of the polarization-sensitive beam splitter, the polarization conversion means and color separation means. The present configuration occupies a relatively large space in the projection system. However, the market demands lighter and more compact projection systems.

It is an object of the invention to provide an image projection system in which the space occupied by the illumination system is reduced. This object is achieved by the image projection system according to the invention as defined in claim 1. In this configuration, the spaces occupied by the color separation means, the polarization conversion means and the polarization-sensitive filter means may coincide or at least overlap. Therefore, this design occupies less space than the cascade configuration of separate polarization-sensitive filter means, polarization conversion means and separate color filter means as in the conventional projection system. A further advantage is that, when dichroic mirrors are applied as color separation means, the dichroic filters can be used to function optimally by situating them perpendicularly to the paths of the first and second light beams. Further advantageous embodiments of the projection system according to the invention are defined in the dependent claims.

A particular embodiment of the projection system according to the invention is defined in claim 2.

A further embodiment of the projection system according to the invention is defined in claim 3. In conventional projection systems, the angle of incidence of the light beam on the dichroic mirror varies across the illumination window of the dichroic mirror because the spectral properties vary across the illumination window of the dichroic mirror a color shift will then be produced in the illumination window of the image panel. When the dichroic mirror is situated perpendicularly to the light beam, a color shift will not be produced in the illumination window of the first and second image panels.

A further embodiment of the projection system according to the invention is defined in claim 7. Such a tunnel system has the advantage that the cross-section of the first light beam never becomes larger than the illumination window. The illumination window is defined as the dimensions of the cross-section of the light beam at the position of the image panel.

A further embodiment of the projection system according to the invention is defined in claim 8. For example, three prisms may be used and an air gap may be applied as the thin layer of material between the facing planes of the prisms to ensure total internal reflection of the light beam. When the light beam in the optical tunnel is telecentric and the tunnel has a mirror symmetry along the optical axes in a first and a second dimension, respectively, the light beam traverses such an optical tunnel while at each cross-section perpendicular to the light beam, the light beam remains geometrically identical.

A further embodiment of the projection system according to the invention is defined in claim 11. This embodiment provides a compact design for a three-image panel projection system.

Figure 2:
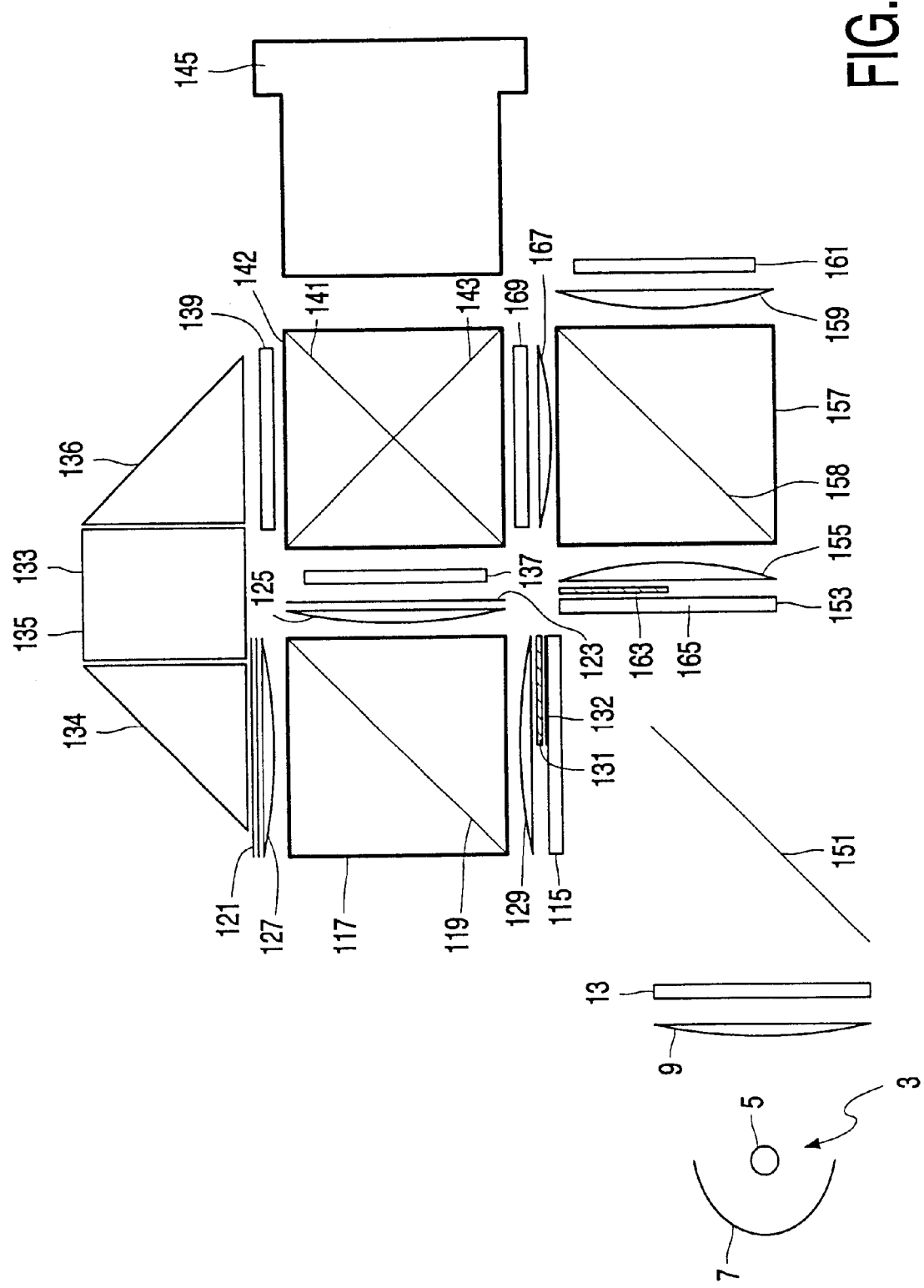

These and other aspects of the invention are apparent from and will be elucidated with reference to the embodiments described hereinafter. In the drawings:

FIG. 1 shows a first embodiment of the image projection system according to the invention and FIG. 2 shows a second embodiment of the image projection system according to the invention.

The image projection system 1 shown in FIG. 1 comprises an illumination system 3 for supplying an illumination beam. The illumination system 3 comprises a radiation source 5, a reflector 7 and a condenser lens 9. The reflector 7 at least partly surrounds the radiation source 5 and ensures that the greater part of the light emitted by the radiation source in a direction away from the system as yet reaches the system.

The illumination beam generated by the illumination system 3 is incident on the modulation system, represented for the sake of simplicity by two image panels 37,39 and is modulated thereby in conformity with the image information to be displayed. The light modulated by the image panels 37,39 is projected on a screen (not shown) by means of a projection lens system represented for the sake of simplicity by a single projection lens 45. Furthermore, the image projection system preferably comprises a color filter wheel 51 and a drive 53 coupled to the color filter wheel 51, both situated between the radiation source 5, and integrating means 11 for supplying a magenta and a yellow light beam to the display system. The integrating system 11 is preferably provided with first and second lens plates 13,15. Furthermore, the image projection system comprises polarization-sensitive filter means, for example a polarizing beam splitter 17, color filter means comprising, for example, first and second dichroic mirrors 21,23 and polarization conversion means comprising a first mirror 33 and a quarter-wave plate 31. The first mirror 33 is preferably situated in the plane of the second integrator plate 15. The quarter-wave plate 31 is situated between the first mirror 33 and the polarizing beam splitter 17. The first mirror 33 and the quarter-wave plate 31 may be divided into several sub-assemblies which are distributed on the surface of the second lens plate 15 facing the polarizing beam splitter 17. The polarizing beam splitter 17 is situated between the second lens plate 15 of the integrating means and the first and second dichroic mirrors 21,23. The first dichroic mirror 21 is situated between a first exit aperture of the polarizing beam splitter 17 and the first image panel 39. The second dichroic mirror 23 is situated between a second exit aperture of the polarizing beam splitter 17 and the second image panel 37. The image panels 37,39 comprise, for example, transmissive liquid crystal image panels.

In operation, unpolarized light from the illumination system 3 is incident on the polarizing beam splitter 17 via the integrator system 11, which comprises the first and second lens plates 13,15 and a first relay lens 29. The interface 19 of the polarizing beam splitter 17 transmits a first sub light beam having a polarization in a first direction, which first sub light beam contributes to a first light beam illuminating the first display 39. The interface 19 of the polarizing beam splitter 17 reflects a second sub light beam which contributes to the second light beam having a second direction of polarization, which is perpendicular to the first direction of polarization. The second light beam illuminates the second image panel 37. The first light beam is incident on the first dichroic mirror 21 via a second relay lens 27. The first dichroic mirror 21 transmits only the red light to the first liquid crystal image panel 39 via the folding mirror 35. The liquid crystal image panel 39 modulates the red first light beam and transmits the modulated first light beam to an entrance pupil of a projection lens 45 via a re-combination mirror 41. The projections lens images the recombined first and second light beams on a screen (not shown). The second light beam is reflected towards the second dichroic mirror 23 via a third relay lens 25. The second dichroic mirror 23 transmits green or blue light of the second light beam to the second liquid crystal image panel 37. The second liquid crystal image panel 37 modulates the green or blue light beam and transmits the modulated second light beam to the projection lens 45 via a folding mirror 43 and the recombination mirror 41. Furthermore, the first dichroic mirror 21 reflects a third sub light beam of green or blue light having the first direction of polarization, and the second dichroic mirror 23 reflects a fourth sub light beam of red light having the second polarization direction. The first dichroic mirror 21 reflects the third sub light beam to the first mirror 33 via the second relay lens 27, the polarizing beam splitter 17, the first relay lens 29 and the quarter-wave plate 31. The quarter-wave plate 31 converts the linear polarization direction of the third sub light beam into a circular polarization, for example in a clockwise rotation. The first mirror 33 reverses the clockwise polarization into an anti-clockwise rotation and reflects the third sub light beam towards the polarizing beam splitter 17 via the quarter-wave plate 31 and the first relay lens 29. The quarter-wave plate 31 converts the third anti-clockwise rotating polarized sub light beam into a converted third green or blue sub light beam having the second polarization direction. The interface 19 of the polarizing beam splitter 17 reflects the third sub light beam towards the second liquid crystal image panel 37 via the third relay lens 25 and the second dichroic mirror 23. Furthermore, the polarizing beam splitter 17 is arranged to combine the second sub light beam and the converted third sub-light beam into the second light beam. Furthermore, the second dichroic mirror 23 reflects the fourth sub light beam of red light and having the second direction of polarization to the first mirror 33 via the second relay lens 27, the polarizing beam splitter 17, the first relay lens 29 and the quarter-wave plate 31. The quarter-wave plate 31 converts the linear polarization direction of the fourth sub light beam into a circular polarization, for example, an anti-clockwise rotation. The first mirror 33 reverses the anti-clockwise polarization of the fourth sub light beam into a clockwise rotation and reflects the fourth sub light beam towards the polarizing beam splitter 17 via the quarter-wave plate 31 and the first relay lens 29. The quarter-wave plate 31 converts the clockwise rotating polarized fourth sub light beam into a converted fourth red sub light beam having the first polarization direction. The interface 19 of the polarizing beam splitter 17, which interface transmits light of the first direction of polarization, transmits the fourth sub light beam to the first liquid crystal image panel 39 via the second relay lens 27, the first dichroic mirror 21 and the folding mirror 35. The polarizing beam splitter 17 is further arranged to combine the first sub light beam and the converted fourth sub-light beam into the first light beam. The first image panel 39 is only driven by red image information. The second image panel 37 is simultaneously driven with the image information of the color of the corresponding illumination, thus alternately green or blue image information.

Furthermore, the first and second lenses 13, 15 of the integrating system 11 and the first relay lens 29 are designed in such a way that the illumination window has the proper size to cover the image panels 37,39. The second and third lenses 25,27 are designed in such a way that the illumination is telecentric. Together, these criteria for the lenses 25,27,29 ensure that an illumination spot on the first mirror 33 has the same size and geometrical properties as those of the illumination spot on the second integrator plate 15.

In a second embodiment of the image projection system according to the invention, the system comprises an illumination system and a display system comprising three image panels. An embodiment using three image panels is shown in FIG. 2. In this embodiment, the image projection system comprises an integrator system 13,115,153, in which first color filter means 151 are integrated for supplying a combined first and second light beam to a first image panel 139 and a second image panel 137 and for supplying a third light beam to a third image panel 169. Furthermore, the projection system comprises first and second polarization-sensitive filter means, for example, first and second polarizing beam splitters 117,157 and second color filter means comprising, for example, first and second dichroic mirrors 121,123. The projection system further comprises first and second polarization conversion means 131,163. The first polarization conversion means comprises a first mirror 132 and a quarter-wave plate 131. The first mirror 132 is preferably situated in the plane of the second integrator plate 115. The quarter-wave plate 131 is situated between the first mirror 132 and the first polarizing beam splitter 117. The first mirror 132 and the quarter-wave plate 131 may be divided into several sub-assemblies which are distributed on the surface of the second lens plate 115, facing the first polarizing beam splitter 117. The first polarizing beam splitter 117 is situated between the second lens plate 115 of the integrating means and the first and second dichroic mirrors 121,123. The first dichroic mirror 121 is situated between a first exit aperture of the first polarizing beam splitter 117 and the first image panel 139. The second dichroic mirror 123 is situated between a second exit aperture of the first polarizing beam splitter 117 and the second image panel 137. The image panels 137,139,167 comprise, for example, transmissive liquid crystal image panels.

In operation, unpolarized light from the illumination system 3 is incident on the integrator system, which may comprise first and second lens plates 113,115 or the first lens plate 113 and a third lens plate 153 and the first color filter means, which comprise, for example, a third dichroic mirror 151. The third dichroic mirror 151 is situated between the first and second lens plates 115,117 and between the first and third lens plates 115,153. The third dichroic mirror 151 passes the blue light forming the third light beam to the third lens plate 153 and reflects the red and green light as a combined first and second light beam on the first polarizing beam splitter 117 via the second lens plate 115 and a first relay lens 129. An interface 119 of the first polarizing beam splitter 117 transmits a first sub light beam contributing to the first light beam, having a polarization in a first direction.

Furthermore, the interface 119 of the first polarizing beam splitter 117 reflects a second sub light beam contributing to the second light beam, having a second direction of polarization perpendicular to the first direction of polarization. The first light beam is incident on the first dichroic mirror 121 via a second lens 127. The first dichroic mirror 121 transmits only the red light contributing to the first light beam to the first liquid crystal image panel 139 via the tunnel system 133. The first liquid crystal image panel 139 modulates the red first light beam and transmits the modulated first light beam to the entrance pupil of a projection lens 145 via a dichroic cross 142. The projection lens 145 images the recombined light beam on a screen (not shown). The interface 119 of the first polarizing beam splitter 117 reflects the second light beam towards the second dichroic mirror 123 via a third relay lens 125. The second dichroic mirror 123 transmits the green light of the second light beam to the second liquid crystal image display 137. The second liquid crystal image panel 137 modulates the green light beam and transmits the modulated second light beam to the entrance pupil of the projection lens 145 via the dichroic cross 142.

Furthermore, the first dichroic mirror 121 reflects a third sub light beam of green light having the first polarization direction, and the second dichroic mirror 123 reflects a fourth sub light beam of red light and having the second polarization direction. The first dichroic mirror 121 reflects the third sub light beam to the first mirror 133 via the second relay lens 127, the polarizing beam splitter 117, the first relay lens 129 and the quarter-wave plate 131. The quarter-wave plate 131 converts the linear polarization direction of the third sub light beam into a circular polarization, for example, a clockwise rotation. The first mirror 133 reverses the clockwise polarization into an anti-clockwise rotation and reflects the third sub light beam towards the first polarizing beam splitter 117 via the quarter-wave plate 131 and the first relay lens 129. The quarter-wave plate 131 converts the anti-clockwise rotating polarized third sub light beam into a converted third green sub light beam having a second polarization direction. The polarizing beam splitter 117 is arranged to combine the second sub light beam and the converted third sub-light beam into a green second light beam, and the interface 119 of the polarizing beam splitter 17 reflects the second light beam towards the second liquid crystal image panel 137 via the third relay lens 125 and the second dichroic mirror 123.

Furthermore, the second dichroic mirror 123 reflects the fourth sub light beam to the first mirror 133 via the second relay lens 127, the interface 119 of the first polarizing beam splitter 117, the first relay lens 129 and the quarter-wave plate 131. The quarter-wave plate 131 converts the linear polarization direction of the fourth sub light beam into a circular polarization, for example, an anti-clockwise rotation. The first mirror 133 reverses the anti-clockwise polarization of the fourth sub light beam into a clockwise rotation and reflects the fourth sub light beam via the quarter-wave plate 131 and the first relay lens 129 towards the first polarizing beam splitter 117. The quarter-wave plate 131 converts the fourth clockwise rotating polarized sub light beam into a converted fourth red sub light beam having the first polarization direction. The interface 119 of the polarizing beam splitter 117 transmits the fourth sub light beam to the first liquid crystal image panel 139 via the second relay lens 127, the first dichroic mirror 121 and the tunnel system 135. The first polarizing beam splitter 117 is arranged to combine the first sub light beam and the converted fourth sub-light beam into a combined first light beam of the same color. The first and second dichroic mirrors 121,123 are preferably arranged so as to be substantially perpendicular to the paths of the first and second light beams, respectively.

Furthermore, the third dichroic mirror 151 transmits a third light beam to the second polarizing beam splitter 157 via a third lens plate 153 of the integrator system and a fourth relay lens 155. The second polarizing beam splitter 157 is situated between the third lens plate 115 of the integrating means 11, a second mirror 161 and the third image panel 169. The interface 158 of the second polarizing beam splitter 157 reflects a fifth sub light beam contributing to the third light beam having the second direction of polarization and transmits a sixth sub light beam having the first direction of polarization. The interface 158 reflects the third light beam to a third image panel 169 via a sixth relay lens 167. The third image panel 169 modulates the third light beam and transmits the modulated third light beam to the dichroic cross 142. The dichroic cross 142 combines the modulated third light beam with the modulated first and second light beams into a single light beam, which is incident in the entrance pupil of the projections lens 145.

Furthermore, the sixth sub light beam is passed to the second mirror 161 via a seventh relay lens 159. The second mirror 161 reflects the sixth sub light beam via the seventh relay lens 159, the second polarizing beam splitter 157, the sixth relay lens 155 to the second polarization conversion means including the second quarter-wave plate 163 and a third mirror 165. The second quarter-wave plate 163 converts the linear polarization direction of the sixth sub light beam into a circular polarization, for example, an anti-clockwise rotation. The third mirror 165 reverses the anti-clockwise polarization of the sixth sub light beam into a clockwise rotation and reflects the sixth sub light beam towards the second polarizing beam splitter 157 via the second quarter-wave plate 163 and the six relay lens 155. The second quarter-wave plate 163 converts the clockwise rotating polarization of the sixth sub light beam into a converted sixth blue sub light beam having the second polarization direction. The second polarizing beam splitter 157 is arranged to combine the fifth sub light beam and the converted sixth sub-light beam into the third light beam, and the interface 158 of the second polarizing beam splitter 157 transmits the third light beam to the third image panel 169 via the fifth relay lens 167.

The third mirror 165 and the second quarter-wave plate 163 are preferably situated in the plane of the third lens plate 153. Furthermore, the third mirror 165 and the second quarter-wave plate 163 may be divided into portions and distributed across the surface of the third lens plate 153.

An alternative solution for the second beam splitter 117, the sixth lens 159 and the mirror 161 is the application of a folding mirror situated in the plane of the interface 119 and a polarization-sensitive filter situated between the sixth lens 167 and the third image panel 169. An example of a polarization-sensitive filter is a DBEF-plate as can be supplied by 3M. Other examples are a wired grid polarizer or a cholesteric reflector, the latter being known per se from European patent application EP-A-606940.

It should be noted that the above-mentioned embodiments illustrate rather than limit the invention, and that those skilled in the art will be able to design many alternative solutions without departing from the scope of the claims.

What is claimed is:

1. An image projection system comprising an illumination system comprising a radiation source for supplying a first and a second light beam in a first and a second color, respectively, a modulation system comprising two image panels for modulating the first and second light beams with image information, polarization-sensitive filter means situated between the radiation source and the modulation system for supplying a first sub light beam contributing to the first light beam having a first direction of polarization and for supplying a second sub light beam contributing to the second light beam having a second direction of polarization, the second direction being perpendicular to the first direction, polarization conversion means situated between the radiation source and the polarization-sensitive filter means, color-filtering means situated between the polarization-sensitive filter means and the modulation system for supplying, in combination with the polarization-sensitive filter means and the polarization conversion means, the first light beam having a first color and a first direction of polarization and the second light beam having a second color and a second direction of polarization, characterized in that the color filter means are further arranged to transmit a first light sub-beam of the first color contributing to the first light beam, a second light sub-beam of the second color contributing to the second light beam, to reflect a third sub-light beam of the second color and the first direction of polarization and a fourth sub-light beam of the second color and the second direction of polarization, respectively, the polarization conversion means are situated between the radiation source and the polarization-sensitive filter means for converting the second direction of polarization of the reflected fourth light sub-beam into the first direction of polarization and the first direction of polarization of the reflected third light sub-beam into the second direction of polarization and the polarization-sensitive filter means are arranged to combine the first light sub-beam and the fourth light sub-beam in the first light beam and the second and third light sub-beams in the second light beam.

2. An image projection system as claimed in claim 1, wherein the color filter means comprises a first dichroic mirror situated between a first exit aperture of the polarization-sensitive filter means and the modulation system for supplying the first light sub-beam of the first color and reflecting the third light sub-beam of the second color, and a second dichroic mirror situated between a second exit aperture of the polarization-sensitive filter means and the modulation system for supplying the second light sub-beam of the second color and reflecting the fourth light sub-beam of the first color.

3. An image projection system as claimed in claim 2, wherein the dichroic mirrors are situated perpendicularly to the paths of the first and second light beams.

4. An image projection system as claimed in claim 1, wherein the polarization conversion means comprises a first mirror situated between the radiation source and the polarization-sensitive filter means for reflecting the third and fourth light sub-beams back to the polarization-sensitive filter means, and a quarter-wave plate situated between the first mirror and the polarization-sensitive filter means for converting, in combination with the first mirror, the directions of polarization of the respective reflected third and fourth light sub-beams into the respective second and first directions of polarization.

5. An image projection system as claimed in claim 1, wherein the polarizationsen-sitive filter means comprises a polarizing beam splitter.

6. An image projection system as claimed in claim 1, wherein the projection system comprises an extra optical system for telecentric illumination of the polarization-sensitive filter means.

7. An image projection system as claimed in claim 1, wherein the projection system comprises an optical tunnel system for re-imaging an illumination window of a first light beam near an exit plane of the color filter means on top of the first image panel.

8. An image projection system as claimed in claim 7, wherein the optical tunnel system comprises multiple prisms, each prism comprising an optically transparent material having a first and a second refractive index, the planes of the prisms facing each other being separated by a layer comprising a material having a third refractive index which is lower than the first refractive index and is lower than the second refractive index so as to ensure total internal reflection in the optical tunnel for a part of the first light beam.

9. An image projection system as claimed in claim 1, characterized in that the image projection system is provided with an integrator system comprising a first and a second integrator plate situated between the radiation source and the polarization-sensitive filter means for providing a uniform illumination of the image panels.

10. An image projection system as claimed in claim 9, characterized in that the first mirror is situated in the plane of the second integrator plate.

11. An image projection system as claimed in claim 9, characterized in that the projection system further comprises a third image panel for modulating a third light beam, and second color filter means situated in the integrator means for supplying a combined first and second light beam to the polarization-sensitive filter means and for supplying a third light beam for illumination of the third image panel.

* * * * *